(12) United States Patent
Weis

(10) Patent No.: US 6,532,716 B1
(45) Date of Patent: Mar. 18, 2003

(54) DEVICE AND METHOD FOR FOLDING A GAS BAG

(75) Inventor: Andreas Weis, Aschaffenburg (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/336,040

(22) Filed: Jun. 18, 1999

(30) Foreign Application Priority Data

Jun. 19, 1998 (DE) ..................................... 298 11 042 U

(51) Int. Cl.⁷ ............................................... B65B 39/00
(52) U.S. Cl. ............................. 53/258; 53/244; 53/580; 493/457; 493/449
(58) Field of Search ............................. 493/457, 449, 493/458; 280/728.1, 743.1; 53/244, 258, 580

(56) References Cited

U.S. PATENT DOCUMENTS

| 4,183,550 A | * | 1/1980 | Sudou ..................... 280/728.2 |
| 5,022,676 A | * | 6/1991 | Rogerson et al. ......... 280/728.2 |
| 5,193,846 A | * | 3/1993 | Allard ..................... 280/728.2 |
| 5,690,358 A | | 11/1997 | Marotzke |
| 5,984,852 A | * | 11/1999 | Heudorfer et al. .......... 493/457 |
| 6,115,998 A | * | 9/2000 | Reh et al. |
| 6,171,228 B1 | * | 1/2001 | Marotzke et al. ........... 493/405 |
| 6,250,676 B1 | * | 6/2001 | Werstat et al. |

FOREIGN PATENT DOCUMENTS

WO    WO 9710123    3/1997

* cited by examiner

Primary Examiner—Peter Vo
Assistant Examiner—Sam Tawfik
(74) Attorney, Agent, or Firm—Tarolli, Sundheim, Covell & Tummino L.L.P.

(57) ABSTRACT

A device for introducing an gas bag into a pot-shaped receiving container with an insertion opening for insertion of the gas bag and an installation opening at the bottom for the arrangement of an inflator is provided. The device comprises a tubular housing having a cross-section adapted to the insertion opening of the receiving container, and an axially reciprocating ram arranged in the housing and serving for introducing the gas bag into the receiving container. Further, a method for folding a gas bag is provided, wherein the gas bag is introduced into a tubular housing, wherein a body is introduced into the gas bag as a dummy for an inflator intended to be mounted later, and wherein the gas bag is folded around the body.

7 Claims, 2 Drawing Sheets

DEVICE AND METHOD FOR FOLDING A GAS BAG

The invention relates to a device for folding an gas bag.

BACKGROUND OF THE INVENTION

Inflatable gas bags in vehicles serve to protect occupants from impact in a collision, sensors being used to sense vehicle deceleration exceeding a critical value and to activate, via an electronic control means, an inflator providing a sufficiently large volume of gas to fill the gas bag within a very short period of time. The gas bags are arranged in the vehicle so that direct impact of the occupant with parts of the vehicle body is prevented in a collision.

For accommodating the gas bags in the vehicle they are folded together to a minimum volume. The folding has to be designed in a way the instant inflation of the gas bag will not be obstructed or delayed. In the case of a head-on collision of the vehicle the gas bags need to be inflated within 30–40 ms, in a side-impact collision no more than 10 ms are available therefore.

Various methods are known for folding the gas bags in place, all of which have the disadvantage that relatively complicated devices are needed for satisfactory folding in place and that the folding procedure itself is highly time-consuming.

The invention is based on the object of proposing a device for introducing a gas bag into a pot-shaped receiving container having a installation opening at the bottom for the arrangement of an inflator, this device being structured substantially simpler, permitting shorter job timing intervals for folding in place and is easily adaptable to differing installation conditions for the gas bag. In addition the device is adapted to be integrated in automated production lines and to operate reliably with no problem over a long working period requiring minimum maintenance.

BRIEF DESCRIPTION OF THE INVENTION

This object is achieved by means of a device for introducing an gas bag into a pot-shaped receiving container with an insertion opening for insertion of the gas bag and an installation opening at the bottom for the arrangement of an inflator is provided. The device comprises a tubular housing having a cross-section adapted to the insertion opening of the receiving container, and an axially reciprocating ram arranged in the housing and serving for introducing the gas bag into the receiving container. It has been found out that by means of such a device an gas bag initially accommodated elongated can be compacted into the desired package shape simply by advancing the ram without it being necessary — as usual hitherto — to implement highly specific folds in a predetermined time sequence. By interaction between the force exerted via the ram and the restoring forces of the fabric material of the airbag every arbitrary fold of the gas bag individually not predictable, is achieved in the space available in the pot-shaped receiving container. It could be verified by extensive trials that an airbag folded in this way can be deployed with no problem within the time available for instant inflation. It will readily be appreciated that the straightforward axial displacement of a ram in a tubular housing is much easier to achieve than a defined folding routine for which a much more complicated device is needed. In the device in accordance with the invention the gas bag simply needs to be introduced into the tubular housing, the tubular housing inserted into the pot-shaped receiving container and the gas bag then compacted by extending the ram.

The object mentioned above is also achieved by means of a method for folding a gas bag is provided, wherein the gas bag is introduced into a tubular housing, wherein a body is introduced into the gas bag as a dummy for an inflator intended to be mounted later, and wherein the gas bag is folded around the body. Concerning the advantages achieved with such method, reference is made to the explanation given above with respect to the device according to the invention.

Advantageous further aspects and variants of the invention read from the sub-claims.

BRIEF DESCRIPTION OF THE DRAWINGS

Further details will now be detailed with reference to embodiments depicted in FIGS. 1 to 5, in which.

DETAILED DESCRIPTION OF THE INVENTION

Figure 1:
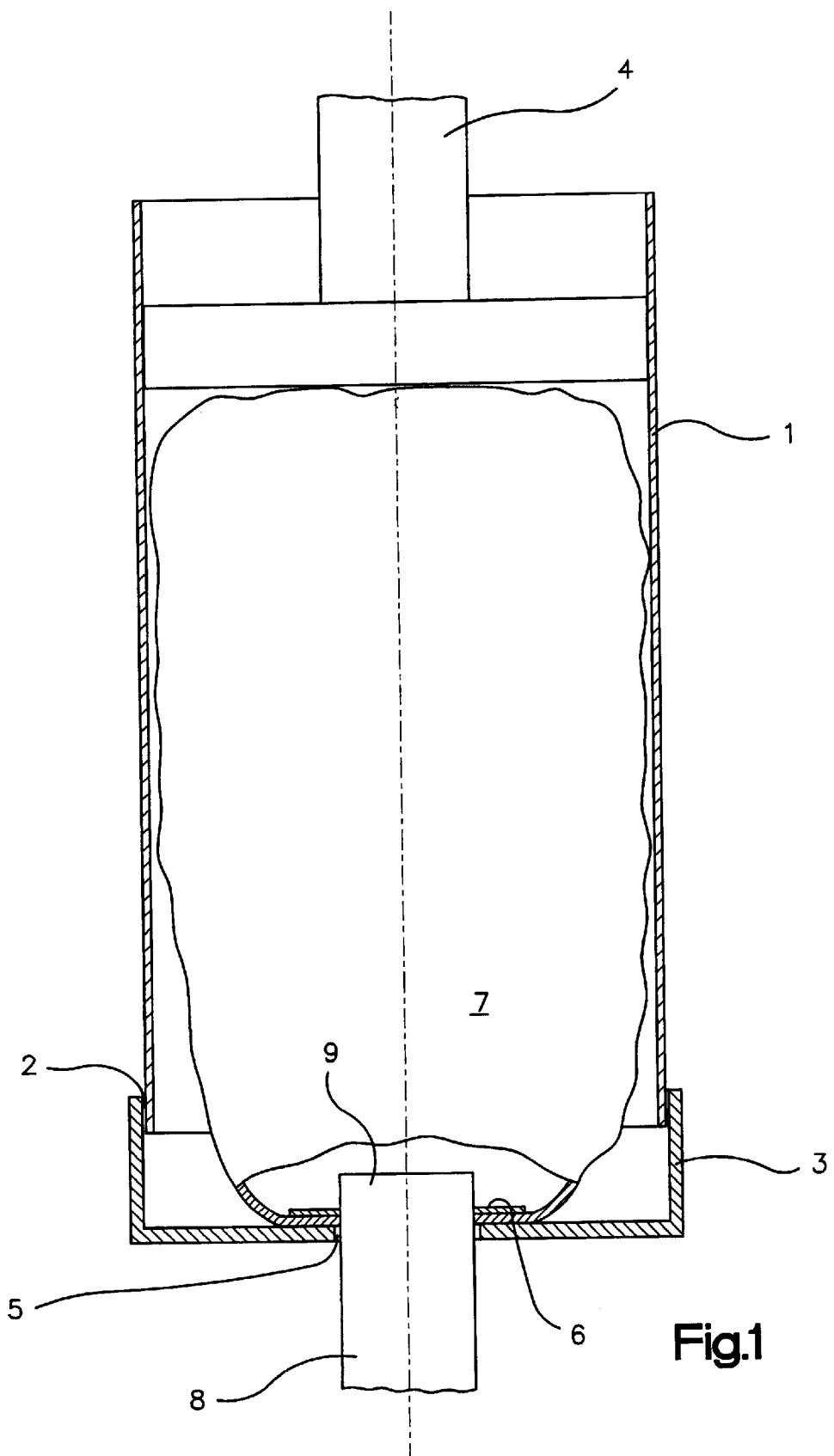
FIG. 1 is a vertical section through a first embodiment of the device in accordance with the invention.

Referring now to FIG. 1 there is illustrated in the sectioned drawing how a tubular housing 1 is inserted in the insertion opening 2 of a receiving container 3. The insertion opening 2 of the receiving container 3 may differ in cross-section depending on the conditions for installation in the vehicle. To achieve the gist of the invention it is merely necessary that the tubular housing and also, of course, the axially displaceable ram 4 therein feature a cross-section adapted to the insertion opening 2. Before the tubular housing 1 is inserted into the receiving container 3 an gas bag 7 needs to be inserted in the tubular housing 1. Such gas bags are usually fitted with a mounting plate 6, the receiving container 3, gas bag 7 and mounting plate 6 comprising substantially congruent installation openings for the arrangement of an inflator. The gas bag 7 is clamped in place between the mounting plate 6 and the bottom of the receiving container 3, various means coming into consideration for locating the mounting plate 6 in place relative to the receiving container 3. Since for safety reasons the inflator is mostly fitted later, the device in accordance with the invention further features a body 9 adapted to be inserted through the installation opening 5 of the receiving container 3 and serving as a dummy for the inflator. In the embodiment shown in FIG. 1, the body forms the upper part of a rod 8 which is coaxial with respect to the ram 4 and which can reciprocate relative thereto. This rod has preferably a length sufficient to bring the gas bag 7 inserted into the receiving container 1 into the elongated shape as shown, it being namely important for deploying the gas bag that the portion of the gas bag fabric opposite the installation opening 5 is located roughly in the middle of the ram 4 prior to being folded together, otherwise this portion might be trapped in arbitrary folding in the device in accordance with the invention so that deployment is obstructed or delayed. It is, of course, also possible to clamp the upper central portion of the gas bag 7 in place between the ram 4 and the body 9 forming the upper part of the rod 8 and to travel the rod 8 down in the same sense as the ram 4 in folding together the gas bag until the final position is attained, as shown. In this position the body 9 defines the space needed for the inflator.

In this arrangement the rod 8 serves simultaneously to align the mounting plate 6 and the gas bag relative to the installation opening 5 in the receiving container 3 in the radial direction. Not shown in FIG. 1 is the way in which the mounting plate 6 is located in place relative to the receiving container 3 and the resulting clamping in place of the gas bag 7. In this respect it could also be located in place by means of magnetic forces, where suitable materials are selected, in addition to the possibilities as evident from FIGS. 2 and 3.

Figure 2:
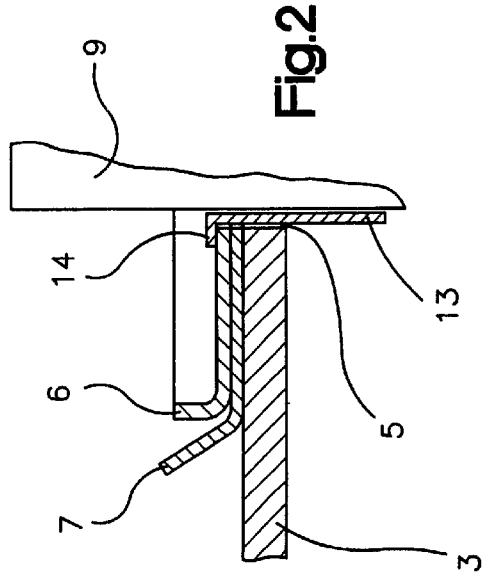
FIG. 2 is a vertical partial section through a second embodiment.

Referring now to FIG. 2 there is illustrated an embodiment-in which the mounting plate 6 has flared edges to avoid the gas bag 7 being pinched by sharp edges. Between the body 9 (merely indicated) and the installation opening 5 of the receiving container 3 a gripper 13 having a hook 14 jutting out in a radial direction is introduced so that the mounting plate 6 can be urged against the receiving container 3 during the folding action.

Figure 3:
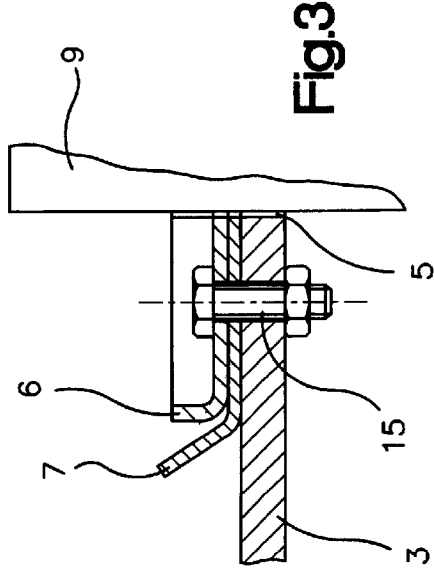
FIG. 3 is a vertical partial section through a third embodiment.

Referring now to FIG. 3 there is illustrated an embodiment in which fastener screws 15 similar to the ones that are also usually employed for securing an inflator (cf. FIG. 4) and for clamping the gas bag 7 in place between the mounting plate 6 and the receiving container 3 are used for locating the mounting plate 6 in place on the receiving container 3. The arrangement of the installation opening 5 and the body 9 is the same as shown in FIG. 1.

Figure 4:
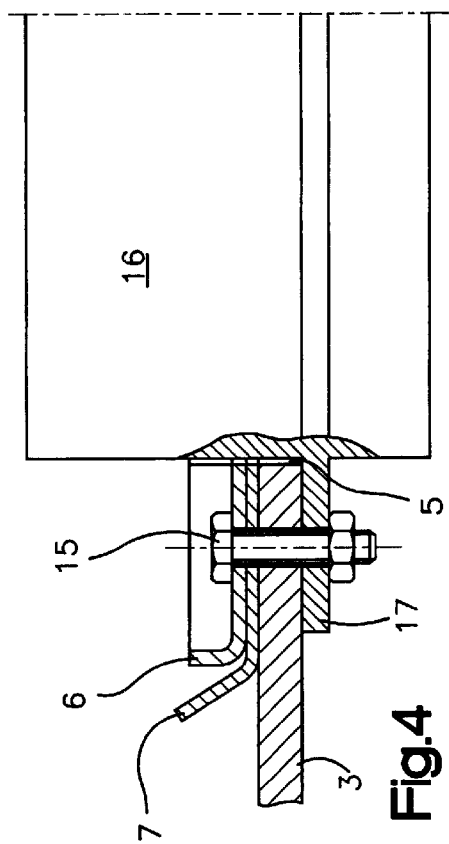
FIG. 4 is a vertical partial section through an embodiment incorporating an inflator.

Referring now to FIG. 4 there is illustrated an embodiment in which the inflator 16 is connected to the receiving container 3 by a flange 17 protruding radially outwards, even before the gas bag 7 is folded together, the fastener screws 15 simultaneously serving to urge the mounting plate 6 against the receiving container 3 and to clamp the gas bag 7 in place, here too the installation opening 5 corresponding to that as shown in FIG. 1 and FIG. 3.

Figure 5:
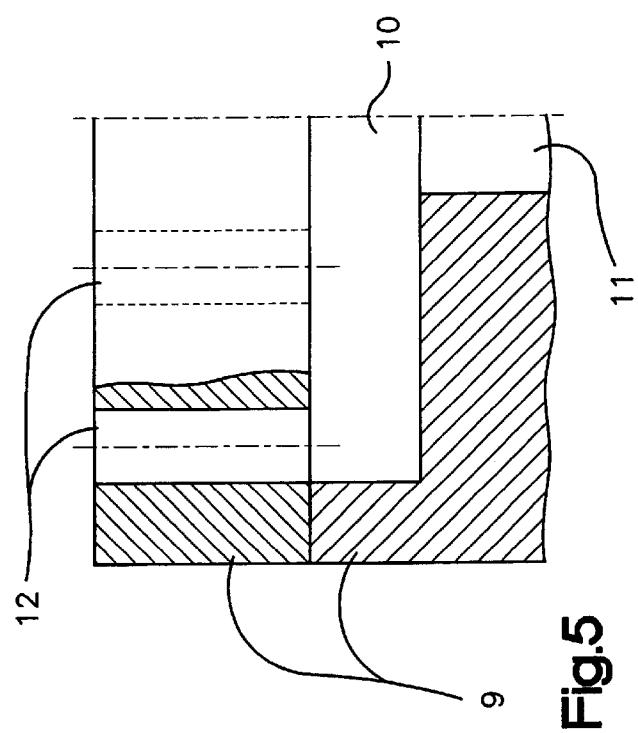
FIG. 5 is a partial section through an embodiment for pneumatically inflating the gas bag in the tubular housing.

Referring now to FIG. 5 there is illustrated how the body 9 forming the upper part of a rod 8 may be configured when the gas bag 7 is to be brought into its elongated form within the tubular housing 1 by means of compressed air. In this case the body 9 is preferably configured two-part, a cavity 10 being connectable via a connecting passage 11 to the source of compressed air, on the one hand, and, on the other, is equipped with at least one discharge opening 12 via which the gas bag 7 is inflatable. It is especially in this embodiment that it may prove expedient for the ram 4 to comprise at its front end a holder for capturing a specific surface area of the gas bag 7. This holder may consist, for example, of a suction pad connectable to a vacuum source.

It will of course, be realized that to complete the arrangement the device in accordance with the invention further requires a machine frame in which the components essential to the invention are positioned and held in place and in which also the necessary drive and circuit items are arranged, this inasmuch involving mechanical engineering means well-known to the person skilled in the art, not needing to be detailed.

What is claimed is:

1. A device for introducing a gas bag into a pot-shaped receiving container having an insertion opening for insertion of said gas bag and an installation opening at the bottom for the arrangement of an inflator, said device comprising a tubular housing having a cross-section adapted to said insertion opening of said receiving container, and an axially reciprocating ram arranged in said housing to advance said gas bag into said receiving container without said gas bag being folded in any specific manner, wherein a body insertable through said installation opening is provided, said body filling out a space provided for said inflator in said receiving container, wherein said body is formed by an upper part of a rod which is coaxial with respect to said ram and which can reciprocate relative thereto, said rod serving for introducing said gas bag into said tubular housing in an unfolded elongated shape.

2. The device of claim 1, wherein said body comprises a cavity which is connected via a connecting passage to a source of compressed gas, and is equipped with at least one discharge opening via which said gas bag inserted in said housing is inflatable.

3. The device of claim 1, wherein means are provided for clamping a mounting plate in said receiving container, said mounting plate being arranged in said gas bag with an installation opening for an inflator coaxial to said installation opening in said receiving container.

4. The device of claim 3, wherein at least two grippers are provided which are adapted to be inserted through said installation opening and which feature hooks which protrude outwardly in a radial direction.

5. The device of claim 3, wherein fastener screws are applied to said mounting plate, said fastener screws being adapted to locate said mounting plate in place on said receiving container.

6. A device for introducing a gas bag into a pot-shaped receiving container having an insertion opening for insertion of said gas bag and an installation opening at the bottom for the arrangement of an inflator, said device comprising a tubular housing having a cross-section adapted to said insertion opening of said receiving container, and an axially reciprocating ram arranged in said housing and serving for introducing said gas bag into said receiving container, said inflator having a flange protruding outwardly in a radial direction, said flange being able to be connected to said receiving container and to a mounting plate of said gas bag, said ram including at its front end a holder for capturing a specific surface portion of said gas bag, said holder including a suction pad connectable to a vacuum source.

7. Apparatus comprising:
   a gas bag;
   a pot-shaped receiving container having an insertion opening for insertion of said gas bag into said container and an installation opening opposite said insertion opening;
   an inflator for receipt in said installation opening, said inflator providing inflation fluid to inflate said gas bag;
   a tubular housing having a cross-section adapted to said insertion opening and for receiving said gas bag in an unfolded elongated condition; and
   an axially reciprocating ram in said tubular housing and for advancing said gas bag into said receiving container through said insertion opening without said gas bag being folded in any specific manner;
   a body insertable through said installation opening and into said gas bag, said body filling out a space provided for said inflator in said receiving container, said body comprising an upper part of a rod which is coaxial with respect to said ram and which can reciprocate relative thereto, said rod serving for positioning said gas bag in said tubular housing in said elongated and unfolded shape prior to said ram moving said gas bag into said receiving container.

* * * * *

UNITED STATES PATENT AND TRADEMARK OFFICE
CERTIFICATE OF CORRECTION

PATENT NO.    : 6,532,716 B1                                        Page 1 of 1
DATED         : March 18, 2003
INVENTOR(S)   : Andreas Weis It is certified that error appears in the above-identified patent and that said Letters Patent is hereby corrected as shown below:

<u>Columns 3 and 4,</u>
Line 61, delete claims 1 through 5 and claim 7.

Signed and Sealed this

Eighteenth Day of November, 2003

JAMES E. ROGAN
*Director of the United States Patent and Trademark Office*